(No Model.)
F. VON EULENFELD.
HORSESHOE CALK.
No. 516,788. Patented Mar. 20, 1894.
FIG. I.
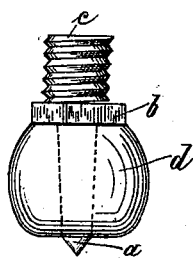
FIG. II.
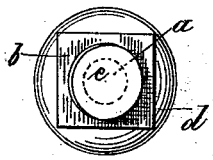
Witnesses:
Munce
Charles Schroeder
Inventor.
F. von Eulenfeld
by
Goepel & Raegener
Attorneys.

UNITED STATES PATENT OFFICE.

FERDINAND VON EULENFELD, OF BRESLAU, GERMANY.

HORSESHOE-CALK.

SPECIFICATION forming part of Letters Patent No. 516,788, dated March 20, 1894.

Application filed March 20, 1891. Serial No. 385,826. (No model.) Patented in France November 3, 1890, No. 209,259; in England November 10, 1890, No. 18,063, and July 3, 1891, No. 11,291; in Belgium December 30, 1890, No. 93,277, and July 27, 1891, No. 95,786; in Austria-Hungary January 7, 1891, No. 36,752 and No. 1,716; in Russia January 17, 1892, No. 8,544; in Canada January 26, 1891, No. 39,538, and in Germany June 12, 1891, No. 57,029.

*To all whom it may concern:*

Be it known that I, FERDINAND VON EULENFELD, a subject of the King of Prussia, and a resident of Breslau, in the Kingdom of Prussia and Empire of Germany, have invented certain new and useful Improvements in Calks for Horseshoes, (for which I have obtained patents in Germany, No. 57,029, dated June 12, 1891; in Austria-Hungary, No. 36,752 and No. 1,716, dated January 7, 1891; in France, No. 209,259, dated November 3, 1890; in England, No. 18,063, dated November 10, 1890, and No. 11,291, dated July 3, 1891; in Russia, No. 8,544, dated January 17, 1892; in Belgium, No. 93,277, dated December 30, 1890, and No. 95,786, dated July 27, 1891, and in Canada, No. 39,538, dated January 26, 1891,) of which the following is a specification.

Heretofore horse-shoes were provided with pointed or sharp-edged calks, which after a short wear became rounded at the ends and were no longer serviceable, as they did not permit the animal to get a firm hold between the pavement or on ice or snow.

The object of my invention is to provide a horse-shoe calk which at all times remains pointed, prevents the horse injuring itself and also serves as a cushion for the horse's hoof.

In the accompanying drawings, Figure I is a side view of my improved calk, and Fig. II is a top view of the same.

Similar letters of reference indicate corresponding parts.

The calk consists of a steel prong $a$ having a conical point and provided at its upper end with a square collar $b$, from which the threaded stem $c$ projects upward. By means of a key applied on the square collar $b$, the threaded stem $c$ can be screwed in the threaded aperture of the horse-shoe. A cushion-ring $d$, made of rubber or other suitable elastic material and of a height slightly less than the length of the prong $a$, is applied on said prong, the upper end of said cushion-ring being cemented or otherwise secured to the under side of the square collar $b$. The prong $a$ at all times retains a point sufficient to enable the horse to obtain a firm grip on the pavement, ice or snow, and the cushion-ring, which is compressed when the horse steps down, forms an elastic support for the hoof. When the hoof is raised the cushion re-expands and surrounds the prong to the point of the same.

The cushion-ring prevents the animal from injuring itself by means of the calk, as said cushion-ring forms a protective covering for the prong.

Having thus described my invention, I claim as new and desire to secure by Letters Patent—

In a horse shoe calk, the combination, with the prong $a$ having the collar $b$ and the screw-threaded upper end $c$, of a cushion-ring, through which said prong projects, the upper end of said cushion-ring resting against the bottom of the collar, substantially as set forth.

In witness whereof I have hereunto set my hand in presence of two witnesses.

FERDINAND VON EULENFELD.

Witnesses:
 ERNEST JAECKEL,
 PAUL CHRVISTEK.